United States Patent [19]

Schaeren

[11] 3,884,966

[45] May 20, 1975

[54] PHENENTHRENE SALTS OF α,γ-DIHYDROXY-β-β,DIMETHYLBUTYRIC ACID

[75] Inventor: Sidney Frank Schaeren, Bottmingen, Switzerland

[73] Assignee: Hoffman-LaRoche Inc., Nutley, N.J.

[22] Filed: Apr. 12, 1966

[21] Appl. No.: 541,976

[52] U.S. Cl............................ 260/501.1; 260/343.6
[51] Int. Cl............................................ C07c 87/42
[58] Field of Search...................... 260/501.1, 343.6

[56] References Cited
UNITED STATES PATENTS
2,319,545  5/1943  Harris, et al.

OTHER PUBLICATIONS
Remington's Pharmaceutical Sciences, 13th Edition, Mack Publishing Co. Easton Penn. (1965), p. 826.

Sjoberg, et al, Arkiv. Kemi, Vol. 22, pp. 447–450 (1964).

*Primary Examiner*—Leon Zitver
*Assistant Examiner*—Gerald A. Schwartz
*Attorney, Agent, or Firm*—Samuel L. Welt; Jon S. Saxe; William H. Epstein

[57] ABSTRACT

A process for resolving racemic pantolactone into its optical antipodes by converting racemic pantolactone into easily separable diastereomeric salts of α,γ-dihydroxy-β,β-dimethylbutyric acid and a 1,4-dimethyl-7-isopropyl phenanthrene derivative which has an amino or aminoalkyl group substituted at the 1-position of the phenanthrene nucleus.

19 Claims, No Drawings

PHENENTHRENE SALTS OF α,γ-DIHYDROXY-β-β,DIMETHYLBUTYRIC ACID

This invention is concerned with a method for resolving D,L-pantolactone (D,L-α-hydroxy-β,β-dimethyl-γ-butyrolactone) into its optical antipodes. More particularly, this invention relates to a method for resolving D,L-pantolactone wherein certain phenanthrene amine derivatives are employed as resolving agents.

D-(−)-pantolactone, which is a precursor of (+)-pantothenic acid and (+)-panthenol, is obtained by resolution of the racemic lactone into its optical antipodes. The resolving technique which is probably most frequently used for the commercial production of the (−)-lactone comprises converting the racemic lactone into the diastereomeric α,γ-dihydroxy-β,β-dimethylbutyric acid salts of quinine, separating these diastereomeric salts from each other by fractional cyrstallization and transforming the quinine salt of the desired optical antipode back into the lactone. Because quinine is now a relatively expensive substance and often is not available in adequate quantities, the economics of this process are dependent to a large extent on the fluctuations of the market situation.

It is an object of the present invention to eliminate the disadvantages connected with the use of quinine and to develop a process in which the resolving agent is a substance which is less expensive and more readily available than quinine.

It has been found by this invention that certain 1,4a-dimethyl-7-isopropyl-octahydro-, dodecahydro- and perhydrophenanthrene derivatives which are readily derived from colophony, a by-product of the terpentine industry, are very well suited for resolving D,L-pantolactone (racemic α-hydroxy-β,β-dimethyl-γ-butyrolactone) into its optical antipodes. Suitable 1,4a-dimethyl-7-isopropyl-octahydro-, dodecahydro- and perhydrophenanthrene derivatives are those which are substituted in 1-position with an amino or an aminomethyl group.

The phenanthrene derivatives which are employed in accordance with this invention are represented by the general formula

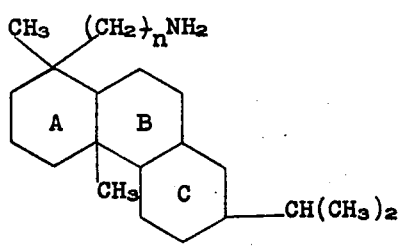

(I)

wherein $n$ is an integer having a value of from 0 to 1, inclusive; and the phenanthrene nucleus is an octahydrophenanthrene ring system having an aromatic C-ring; a$\Delta^{4b(8a)}$-, a$\Delta^7$-, or a $\Delta^8$-dodecahydrophenanthrene ring system or a perhydrophenanthrene ring system.

A preferred class of compounds is represented by the following formula

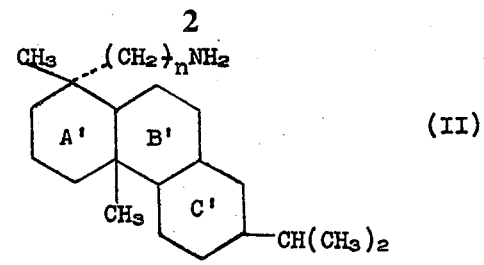

(II)

wherein $n$ is as defined above and the phenanthrene nucleus is octahydrophenanthrene having an aromatic C'-ring, $\Delta^8$-dodecahydrophenanthrene or perhydrophenanthrene.

Especially preferred phenanthrene derivatives include 1β,4aβ-dimethyl-1α-aminomethyl-7-isopropyl-1,2,3,4,4a,9,10,10aα-octahydrophenanthrene (dehydroabietylamine), 1β,4aβ-dimethyl-1α-amino-7-isopropyl-1,2,3,4,4a,9,10,10aα-octahydrophenanthrene (dehydroabietan-1-amine), 1β,4aβ-dimethyl-1α-aminomethyl-7α-isopropyl-1,2,3,4,4a,4bα,5,6,7β,9,10,10aα-dodecahydrophenanthrene (dihydroabietylamine) and 1β,4aβ-dimethyl-1α-aminomethyl-7β-isopropyl-1,2,3,4,4a,4bα, 5,6,7α,8,8aβ,9,10,10aα-tetradecahydrophenanthrene (1β,4aβ-dimethyl-1α-aminomethyl-7β-isopropylperhydrophenanthrene or tetrahydroabietylamine), with the dehydroabietylamine and the dehydroabietan-1-amine being most preferred.

These phenanthrene derivatives are all derivable from colophony. Thus, abietic acid (1-carboxy-1,4a-dimethyl-7-isopropyl-1,2,3,4,4a,4b,5,6,10,10a-decahydrophenanthrene) is produced by treatment of colophony with acid or base. This acid is then converted via thermal disproportionation to the octa-, dodeca- and perhydro- acid compounds. In addition, the dodeca- and perhydro-compounds are obtained by a partial or complete hydrogenation of the abietic acid. The 1-amino derivatives are then obtained via the following reaction sequence:

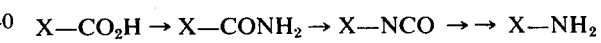

wherein X represents the dimethylisopropylphenanthrene nucleus of the compounds of formula I above.

The corresponding 1-aminomethyl derivatives are obtained in accordance with the following reaction sequence:

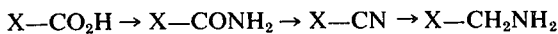

wherein X is as defined above.

The resolution of this invention occurs via the diastereomeric, α,γ-dihydroxy-β,βdimethylbutyric acid salts of the foregoing phenanthrene derivatives. More particularly, the resolution is effected by first forming an alkali metal (e.g., lithium, potassium or sodium) salt of racemic α,γ-dihydroxy-β,β-dimethylbutyric acid, as by treatment of the racemic pantolactone with an alkali metal hydroxide, preferably sodium hydroxide. The resulting alkali metal salt is contacted in aqueous medium with an acid addition salt of the above-described phenanthrene derivatives in a molar ratio of phenanthrene derivative to alkali metal salt of from about 0.5:1 to about 0.6:1, preferably from 0.55:1 to 0.57:1. The resulting reaction mixture is equilibrated to form the more soluble alkali metal salt of D+(−)-α,γ-dihydroxy-β,β-dimethylbutyric acid and the less-soluble phenanthrene derivative salt of L-(−)-α,γ-dihydroxy-β,β-dimethylbutyric acid. The phenanthrene derivative salt, which precipitates from the reaction mixture, is filtered out and the soluble alkali metal salt is then converted to D-(−)-pantolactone in known manner.

The operation of the process of this invention is explained in greater detail, as follows, wherein PD is employed to denote the phenanthrene derivatives of formula (I) and as illustrated by the use of sodium as the alkali metal and the hydrochloride as the phenanthrene derivative acid addition salt. Thus, one mole of D,L-pantolactone is reacted with one mole of sodium hydroxide, thereby forming one mole of sodium α,γ-dihydroxy-β,β-dimethylbutyrate. Upon the addition of one-half mole of PD hydrochloride there is obtained one-quarter mole of the PD salt of D-(+)-α,γ-dihydroxy-β,β-dimethylbutyric acid, one-quarter mole of the PD salt of L-(−)-α,γ-dihydroxy-β,β-dimethylbutyric acid, one-quarter mole of sodium D-(+)-α,γ-dihydroxy-β,β-dimethylbutyrate, one quarter mole of sodium L-(−)-α,γ-dihydroxy-β,β-dimethylbutyrate and one-half mole of sodium chloride. This aqueous mixture is then equilibrated to form one-half mole of the PD salt of L-(−)-α,γ-dihydroxy-β,β-dimethylbutyric acid (which precipitates out in this form), and one-half mole of sodium D-(+)-α,γ-dihydroxy-β,β-dimethylbutyrate (which remains in solution). After filtration to remove the precipitated PD salt, the filtrate is acidified, for example, by the addition of sulfuric acid, to convert the soluble sodium salt to D-(−)-pantolactone. The optionally-active lactone is recovered in any convenient manner, for example by extraction of the aqueous solution with a suitable solvent, such as ether.

The PD salt of L-(−)-α,γ-dihydroxy-β,β-dimethylbutyric acid is readily converted to the free PD base and an alkali metal L-(−)-α,γ-dihydroxy-β,β-dimethylbutyrate by treatment with an alkali metal hydroxide, for example sodium hydroxide. After separation from the alkali metal salt, the free PD base may be converted to its acid addition salt and again employed as a resolving agent. The alkali metal salt may be treated with a mineral acid to form L-(+)-pantolactone, which may be racemized in known manner to the D,L-lactone, followed by further resolution. By operating in this manner one is able to obtain optically-active D-(−)-pantolactone in high yield (85–90%). Moreover, the PD resolving agent, which is recovered in practically 100% yield, may be repeatedly recycled to the resolution (up to 25 times or even more) without having to be purified.

The equilibration of the PD and alkali metal salt mixture is readily effected by heating the aqueous reaction mixture at elevated temperatures for a period sufficient to effect the equilibration. The time necessary for the equilibration varies inversely with the temperature. For example, at least 75 minutes are required at 85°C. but only 30 minutes are necessary at 100°C. in aqueous media. The necessity for heating can be avoided, however, by the addition to the reaction mixture of a polar, water-miscible organic solvent, such as a lower alkanol, for example methanol, ethanol and the like; a di(lower alkyl) ketone such as acetone, methyl ethyl ketone and the like; a lower alkyl nitrile such as acetonitrile and the like; a di(lower alkyl) lower alkanoic acid amide such as dimethylformamide, dimethyl acetamide and the like; or a di(lower alkyl) sulfoxide, such as dimethyl sulfoxide and the like. When such a solvent is added the equilibration is complete within a few minutes even at room temperature.

The acids employed in forming the acid addition salts of the phenanthrene derivatives employed in accordance with this invention are not critical, but preferably are lower alkanoic acids, especially acetic acid, or mineral acids, especially hydrogen chloride or hydrogen bromide.

The diastereomeric salts which are produced by reaction of the alkali metal α,γ-dihydroxy-β,β-dimethylbutanoate and the PD acid addition salt may be represented by the following formula:

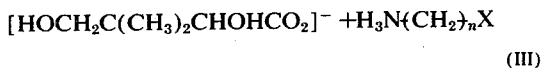

(III)

wherein $n$ and X are as defined above. A preferred class of diastereomeric salts are those of the formula:

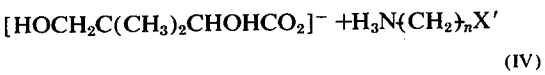

(IV)

wherein $n$ is as defined above and X′ represents the dimethylisopropylphenanthrene nucleus of the phenanthrene derivatives of formula (II).

The following examples are illustrative.

EXAMPLE 1

To a 1.5-liter, four-necked flask fitted with stirrer, reflux condenser, thermometer and 500-milliliter dropping funnel containing 78.0 grams (0.6 mole) of racemic α-hydroxy-β,β-dimethyl-γ-butyrolactone (D,L-pantolactone; recrystallized pure from isopropyl ether m.p. 86°–88°C.) was added 315 milliliters (0.063 mole) of 2N sodium hydroxide. The resulting solution was heated at 70°–80°C. for 20 minutes. The pH of the solution was then adjusted to 8.5 by the addition of 3N hydrochloric acid, and the resulting solution was added with stirring over 10 minutes to a solution of 114.0 grams (0.33 mole) of 1,4aβ-dimethyl-1α-aminomethyl-7-isopropyl-1,2,3,4,4a,9,10,10aα-octahydrophenanthrene acetate (dehydroabietylamine acetate) (m.p. 135°–137°C) in 500 milliliters of distilled water. The reaction mixture was heated at 85° for 75 minutes and then cooled by means of an ice-bath to 5°C. There precipitated a paste of crystals consisting of the dehydroabietylamine salt of L-(−)-α,γ-dihydroxy-β,β-dimethylbutyric acid, which was filtered off by suction and washed with three 80-milliliter portions of water. The combined filtrates were concentrated to 250 milliliters in a rotary evaporator and the precipitate thereby formed was filtered off, to yield an additional 100 milligrams of the dehydroabietylamine salt of L-(−)-α,γ-dihydroxy-β,β-dimethylbutyric acid, which was added to the previously separated main portion of the precipitate.

The solution was acidified with 20 milliliters of concentrated sulfuric acid (pH = 1). After standing at room temperature for one hour, the acidic solution was saturated with about 25 grams of sodium chloride and extracted for 15 hours in a Steudel-Kutscher apparatus (Z. Physiol. Chem. 39, 473) with about 300 milliliters of ether. The extract, containing the D-(−)-α-hydroxy-β,β-dimethyl-γ-butyrolactone, was dried over 20 grams of sodium sulfate, filtered, concentrated and, for removal of acetic acid, twice evaporated on the rotary evaporator with 50-milliliter portions of toluene. There were obtained 38.3 grams of the D-(−)-lactone; $[α]_D^{23} = −42.0°$ (1% in water). The crude lactone was recrystallized from 50 milliliters of isopropyl ether to give 30.9 grams (88%) of pure D-(−)-lactone; m.p. 91°–93°C.; $[α]_D^{24} = −52.0°$ (1% in water).

The combined precipitates obtained as described above consisting of the dehydroabietylamine salt of L-(−)-α,γ-dihydroxy-β,β-dimethylbutyric acid were suspended in 200 milliliters of water in a separating funnel and the suspension obtained was overlaid with 200 milliliters of ether. On the addition of about 35 milliliters of 40% caustic soda (up to phenolphthaleinalkaline reaction), the dehydroabietylamine base was set free from the salt. After vigorous shaking, the organic and the aqueous phases were separated from each other, and the aqueous phase was brought to a pH of 1 with about 10 milliliters of concentrated sulfuric acid and allowed to stand at room temperature for 1 hour. After saturation with sodium chloride and extraction in a Steudel-Kutscher apparatus [as described above for the D-(−)-lactone], there was obtained 39.4 grams (92%) of the L-(+)-lactone; $[\alpha]_D^{23} = +45.7°C$. (1% in water). This L-(+)-lactone can be racemized in a known manner, whereupon the racemate can again be fed back into the process.

The physical properties of the above-obtained diastereomeric salts of dehydroabietylamine with α,γ-dihydroxy-β,β-dimethylbutyric acid are as follows:

Salt of D-(+)-acid: m.p. 157°–8°C. (uncorrected, crystallized from water), 154°–6°C. (uncorrected, crystallized from ethanol); $[\alpha]_D^{24} = +38.6°$ (5% in methanol); solubility in water at 25°C. - 1.5 gram/liter.

Salt of L-(−)-acid: m.p. 185°–6°C. (uncorrected, crystallized from water), 185°–7°C. (uncorrected, crystallized from ethanol); $[\alpha]_D^{24} = +17.2°$ (1% in methanol); solubility in water at 25°C. - 1.4 gram/10 liters

EXAMPLE 2

To a 1.5-liter, four-necked flask, equipped with stirrer, reflux condenser, thermometer and 500-milliliter dropping funnel containing 78.0 grams (0.60 mole) of racemic D,L-pantolactone was added 310 milliliters of 2N sodium hydroxide. The resulting solution was heated at 70°–80°C. for 20 minutes. The pH of the resulting solution was adjusted to 8.5 by the addition of 1N hydrochloric acid and, after the addition of 100 milliliters of water, the mixture was cooled to room temperature. There was then added a solution of 118.16 grams (0.342 mole) of dehydroabietylamine acetate in 400 milliliters of ethanol. After standing for 15 minutes at room temperature, the equilibration was complete as evidenced by the melting point (181°–3°C.) of the paste-like precipitate of the dehydroabietylamine salt of L-(−)-α,γ-dihydroxy-β,β-dimethylbutyric acid. The precipitate was filtered off by suction and washed with three 80-milliliter portions of water. The combined filtrates were concentrated to 250 milliliters in a rotary evaporator and the thus obtained precipitate of dehydroabietylamine salt of L-(−)-α,γ-dihydroxy-β,β-dimethylbutyric acid, after filtering from the concentrate, was added to the previously obtained main portion of the product.

The resulting filtrate was acidified with 20 milliliters of concentrated sulfuric acid and, afer standing for one hour at room temperature, was extracted with 300 milliliters of ether in a Steudel-Kutscher apparatus. The extract, containing D-(−)-pantolactone, was dried over sodium sulfate, concentrated and, to remove acetic acid, was twice evaporated in a rotary evaporator with 50 -milliliter portions of toluene, to obtain 32.9 grams of crude D-(−)-pantolactone; $[\alpha]_D^{24} = -47°$ (1% in water). On recrystallization from 50 milliliters of isopropyl ether there was obtained 29.4 grams (87.7% yield) of pure D-(−)-pantolactone; $[\alpha]_D^{25} = -51.7°$ (3% in water).

EXAMPLE 3

A solution of 13.0 grams (0.10 mole) of D,L-pantolactone in 52 milliliters of 2N sodium hydroxide was heated for 20 minutes at 65°–70°C. in a 300-milliliter, four-necked flask equipped with stirrer, reflux condenser and dropping funnel. The pH of the resulting mixture was adjusted to 8.5 and there was added 17.5 grams (0.057 mole) of 1β,4aβ-dimethyl-1α-amino-7-isopropyl-1,2,3,4,4a,9,10,10aα-octahydrophenanthrene hydrochloride (dehydroabietan-1-amine hydrochloride) [m.p. 280°–285°C., $[\alpha]_D^{23} = +48°$ (3% in methanol)] suspended in 20 milliliters of ethanol and 70 milliliters of water was added. The reaction mixture was stirred for 10 minutes under reflux and the dehydroabietan-1-amine salt of L-(−)-α,γ-dihydroxy-β,β-dimethylbutyric acid (m.p. 157°–9°C.) was suction filtered and carefully washed with water.

The combined filtrates were concentrated to 50 milliliters in a rotary evaporator and the resulting precipitate was added to the main product. The filtrates were acidified to a pH of 1 with 3.5 milliliters of sulfuric acid and, after standing one hour at room temperature, were extracted with ether in a Steudel-Kutscher apparatus. The ether extract was dried over sodium sulfate, filtered and evaporated on a steam bath leaving 7.3 grams of crude D-(−)-pantolactone, $[\alpha]_D^{22}$ about −35° (1% in water; an accurate value was difficult to obtain due to turbidity). The product lactone, after two recrystallizations from isopropyl ether, weighed 5.0 grams (87%), $[\alpha]_D^{24} = -52°$ (3% in water).

The dehydroabietan-1-amine hydrochloride is obtained by treatment of the known dehydroabietan-1-amine with hydrochloric acid. The dehydroabietan-1-amine is obtained in known manner from dehydroabietic acid.

The physical data for the two diastereomeric salts of dehydroabietan-1-amine with α,γ-dihydroxy-β,β-dimethylbutyric acid are as follows:

Salt of D-(+)-acid: sublimes at 220°C.; $[\alpha]_D^{25} = +51°$ (3% in methanol); solubility in water at 20°C. - 1 gram/230 ml.

Salt of L-(−)-acid: m.p. 157°–9°C.; $[\alpha]_D^{24} = +25°$ (3% in methanol); solubility in water at 20°C. - 1 gram/500 ml.

EXAMPLE 4

A mixture of 2.61 grams (0.020 mole) of D,L-pantolactone, 10 milliliters of 2N sodium hydroxide and 10 milliliters of water was heated at 70°C. for 20 minutes in a 200-milliliter, four-necked flask equipped with stirrer, reflux condenser and dropping filter. At 75°C. there was added to the resulting sodium salts a suspension of 3.76 grams (0.011 mole) of 1β,4aβ-dimethyl-1α-aminomethyl-7α-isopropyl-1,2,3,4,4a,4bα,5,6,7β,9,10,10aα-dodecahydrophenanthrene hydrochloride (dihydroabietylamine hydrochloride) m.p. 261°–264°C.; $[\alpha]_D^{23} = -29°$ (1% in methanol), in 65 milliliters of water and then 15 milliliters of water. The reaction mixture was maintained at 85°C. for 60 minutes in an oil bath, and then cooled in a water bath to room temperature. The resulting paste-like crystals of the dihydroabietylamine salt of L-(−)-α,γ-dihydroxy-β,β-dimethylbutyric acid (m.p. 152°–153°C.), were suction filtered and carefully washed with water.

The combined filtrates were condensed to 50 milliliters in a rotary evaporator and the thus obtained precipitate was filtered out and combined with the main product. The filtrate was acidified to a pH of 1 with sulfuric acid and, after standing for one hour at room temperature, extracted with ether in a Steudel-Kutscher apparatus. The ether solution was dried over sodium sulfate, filtered and evaporated on a steam bath to yield 2 grams of crude D-(−)-pantolactone, $[\alpha]_D^{22} = −26°$ (3% in water). After crystallization from isopropyl ether there was obtained 1 gram $[\alpha]_D^{26} = −49.5°$ (3% in water).

The dihydroabietylamine hydrochloride is obtained by treatment of the corresponding base with hydrochloric acid. The dihydroabietylamine is obtainied from the known dihydroabietic acid sequentially via the acid chloride, amide and finally nitrile intermediates. The dihydroabietic acid is obtained from abietic acid by partial hydrogenation in known manner.

The physical properties of the dihydroabietylamine salt of L-(−)-α,γ-dihydroxy-β,β-dimethylbutyric acid are as follows: m.p. 152°–153°C.; $[\alpha]_D^{23} = −24.5°$ (2% in ethanol); solubility in water at 20°C. - 1 gram/16 liters.

EXAMPLE 5

A solution of 3.25 grams (0.025 mole) of D,L-pantolactone in 13 milliliters of 2N sodium hydroxide was heated at 65°–70°C. for 20 minutes in a 200-milliliter, four-necked flask equipped with stirrer, reflux condenser and dropping filter. After the pH of the resulting mixture was adjusted to 8.5 by the addition of 1N hydrochloric acid, there was added a suspension of 4.67 grams (0.0142 mole) of 1β,4aβ-dimethyl-1α-aminomethyl-7-β-isopropyl-1,2,3,4,4a,4bα,5,6,7α,8,8aβ,9,10,10aα-tetradecahydrophenanthrene hydrochloride [tetrahydroabietylamine hydrochloride; m.p. 265°–270°C.; $[\alpha]_D^{26} = +13.8$ (3% in water)] in 20 milliliters of water followed by 30 milliliters of alcohol. The reaction mixture was heated, with stirring, at 80°C. for 1.5 hours, and then cooled to room temperature. The resulting paste-like crystals of the tetrahydroabietylamine salt of L-(−)-α,γ-dihydroxy-β,β-dimethylbutyric acid (m.p. 186°–188°C.), was vacuum filtered and carefuly treated with water.

The combined filtrates were concentrated to 20 milliliters in a rotary evaporator and then acidified (pH = 1) with sulfuric acid. After standing for one hour at room temperature, the solution was extracted with ether overnight in a Steudel-Kutscher extraction apparatus. The ether solution was then dried over sodium sulfate, filtered and evaporated on a steam bath. The residue weighed 1.7 grams, $[\alpha]_D^{24} = −37°$ (1% in water). The crude product was recrystallized from isopropyl ether to obtain 1.0 gram of D-(−)-pantolactone (71.4%), $[\alpha]_D^{25} = −50.6°$ (3% in water).

The tetrahydroabiethylamine hydrochloride is obtained by treatment of the corresponding base with hydrochloric acid. The tetrahydroabietylamine is obtained from the known tetrahydroabietic acid via, in sequence, the acid chloride, amide and nitrile intermediates. The tetrahydroabietic acid is obtained by the hydrogenation of abietic acid.

The physical data for the two diastereomeric salts of tetrahydroabietylamine with α,γ-dihydroxy-β,β-dimethylbutyric acid are as follows:

Salt of D-(+)-acid: m.p. 155°–7°C.; $[\alpha]_D^{25} = +25.0°$ (3% in methanol); solubility in water at 20°C. - 1 gram/7 liters.

Salt of L-(−)-acid: m.p. 186°–8°C.; $[\alpha]_D^{26} = +3°$ (0.5% in methanol); solubility in water at 20°C. - 1 gram/28 liters.

I claim:

1. A salt of α,γ-dihydroxy-β,β-dimethylbutyric acid of the formula:

wherein $n$ is an integer having a value of from 0 to 1 inclusive and X is a radical of the formula:

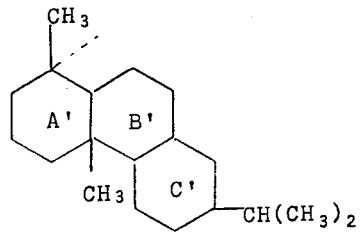

wherein the phenanthrene nucleus is selected from the group consisting of octahydrophenanthrene having an aromatic C' ring, Δ⁸-dodecahydrophenanthrene and per-hydrophenanthrene.

2. The salts as claimed in claim 1 wherein said α,γ-dihydroxy-β,β-dimethylbutanoic acid is the L-(−)-acid.

3. The salt as claimed in claim 2 wherein said phenanthrene derivative is 1β,4aβ-dimethyl-1α-aminomethyl-7-isopropyl-1,2,3,4,4a,9,10,10aα-octahydrophenanthrene.

4. The salt as claimed in claim 2 wherein said phenanthrene derivative is 1β,4aβ-dimethyl-1α-amino-7-isopropyl-1,2,3,4,4a,9,10,10aα-octahydrophenanthrene.

5. The salt as claimed in claim 2 wherein said phenanthrene derivative is 1β,4aβ-dimethyl-1α-aminomethyl-7α-isopropyl-1,2,3,4,4a,4bα,5,6,7β,9,10,10aα-dodecahydrophenanthrene.

6. The salt as claimed in claim 2 wherein said phenanthrene derivative is 1β,4aβ-dimethyl-1α-aminomethyl-7β-isopropyl-1,2,3,4,4a,4bα,5,6,7α,8,8aβ,9,10aα-tetradecahydrophenanthrene.

7. The salts as claimed in claim 1 wherein said α,γ-dihydroxy-β,β-dimethylbutanoic acid is the D-(+)-acid.

8. The salt as claimed in claim 7 wherein said phenanthrene derivative is 1β,4aβ-dimethyl-1α-aminomethyl-7-isopropyl-1,2,3,4,4a,9,10,10aα-octahydrophenanthrene.

9. The salt as claimed in claim 7 wherein said phenanthrene derivative is 1β,4aβ-dimethyl-1α-amino-7-isopropyl-1,2,3,4,4a,9,10,10aα-octahydrophenanthrene.

10. The salt as claimed in claim 7 wherein said phenanthrene derivative is 1β,4aβ-dimethyl-1α-aminomethyl-7α-isopropyl- 1,2,3,4,4a,4bα,5,6,7β,9,10,10aα-dodecahydrophenanthrene.

11. The salt as claimed in claim 7 wherein said phenanthrene derivative is 1β,4aβ-dimethyl-1α-aminomethyl-7β-isopropyl-1,2,3,4,4a,4bα,5,6,7α,8,8aβ,9,10aα-tetradecahydrophenanthrene.

12. A process for producing a diastereomeric salt of the formula:

wherein $n$ is an integer having a value of from 0 to 1 inclusive and X is a radical of the formula:

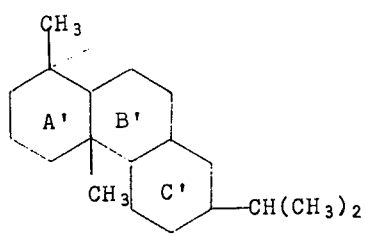

wherein the phenanthrene nucleus is selected from the group consisting of octahydrophenanthrene having an aromatic C' ring, $\Delta^8$-dodecahydrophenanthrene and per-hydrophenanthrene; comprising contacting racemic pantolactone with an alkali metal hydroxide in an aqueous medium to produce an alkali metal salt of racemic α,γ-dihydroxy-β,β-dimethylbutyric acid and reacting in an aqueous medium, one mole of said alkali metal acid salt with 0.5 to 0.6 moles of a lower alkanoic acid or mineral acid addition salt of a phenanthrene derivative of the formula:

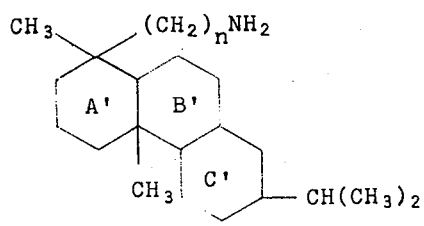

wherein $n$ is as above; and the phenanthrene nucleus is selected from the group consisting of octahydrophenanthrene having a aromatic C' ring, $\Delta^8$-dodecahydrophenanthrene and per-hydrophenanthrene; to form said diasteromeric salts.

13. The process of claim 12 wherein said phenanthrene derivative is dehydroabietylamine.

14. A process for separating diasteromeric salts of the formula:

wherein $n$ is an integer having a value of from 0 to 1 inclusive and X is a radical of the formula:

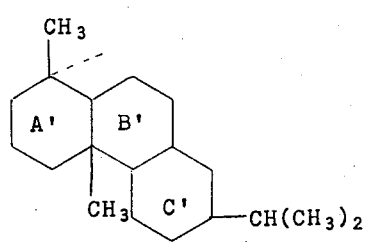

wherein the phenanthrene nucleus is selected from the group consisting of octahydrophenanthrene having an aromatic C' ring, $\Delta^8$-dodcahydrophenanthrene and per-hydrophenanthrene; into their optically active L and D antipodes comprising heating an aqueous solution containing said diastereomeric salt at an elevated temperature to form the L-isomer of said diastereomeric salt as a precipitate with the D-isomer remaining in said aqueous solution and separating said precipitate from said solution.

15. A process for separating diastereomeric salt of the formula:

wherein $n$ is an integer having a value of from 0 to 1 inclusive and X is a radical of the formula:

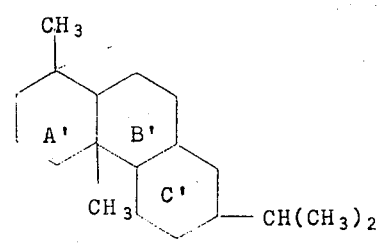

wherein the phenanthrene nucleus is selected from the group consisting of octahydrophenanthrene having an aromatic C' ring, $\Delta^8$-dodecahydrophenanthrene and per-hydrophenanthrene; into their optically active L and D antipodes comprising adding to an aqueous solution containing said diastereomeric salts, a water-miscible inert organic polar solvent to thereby form the L-(+)-salt as a precipitate with the D-(−)-salt remaining in said solution and separating said precipitate from said solution.

16. The process as claimed in claim 15 wherein said organic solvent is a member selected from the group consisting of a lower alkanol, a di(lower alkyl) ketone, a lower alkyl nitrile, a di(lower alkyl) lower alkanoic acid amide and a di(lower alkyl) sulfoxide.

17. A process for producing the D-(−)-salt of the formula:

wherein $n$ is an integer having a value of from 0 to 1 inclusive and X is a radical represented by the formula:

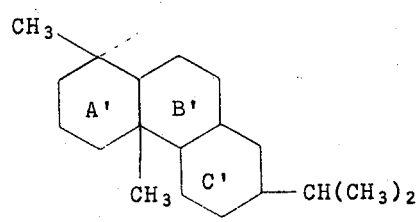

wherein the phenanthrene nucleus is selected from the group consisting of octahydrophenanthrene having an aromatic C' ring, $\Delta^8$-dodecahydrophenanthrene and per-hydrophenanthrene;

comprising;
a. contacting racemic pantolactone with an alkali metal hydroxide in an aqueous medium to produce an alkali metal salt of racemic α,γ-dihydroxy-β,β-dimethylbutyric acid;
b. reacting in an aqueous medium, 1 mole of said alkali metal acid salt with 0.5 to 0.6 moles of a lower alkanoic acid or mineral acid addition salt of a phenanthrene derivative of the formula:

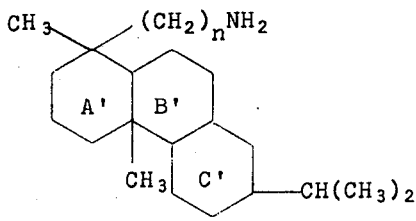

wherein n is as above; and the phenanthrene nucleus is selected from the group consisting of octahydrophenanthrene having an aromatic C' ring, Δ⁸-dodecahydrophenanthrene and perhydrophenanthrene; to form an aqueous solution containing diastereomeric salts of said butyric acid and said phenanthrene derivative;
c. heating said aqueous solution containing said diastereomeric salt at an elevated temperature to form the L-(+)-optical isomer of said diastereomeric salt as a precipitate with said D-(−)-salt remaining in said solution;
d. thereafter separating said precipitate from said solution; and
e. extracting said D-(−)-diastereomeric salt from said solution.

18. A process for producing the D-(−)-salt of the formula:

[HOCH₂C(CH₃)₂CHOHCO₂]⁻ ⁺H₃N(CH₂)ₙX wherein n is an integer having a value of from 0 to 1 inclusive and X is a radical represented by the formula:

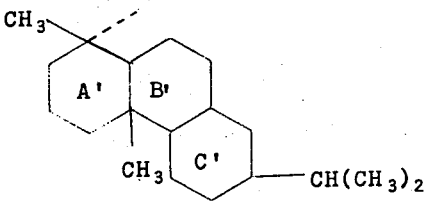

wherein the phenenthrene nucleus is selected from the group consisting of octahydrophenanthrene having an aromatic C' ring, Δ⁸-dodecahydrophenanthrene and perhydrophenanthrene;
comprising;
a. contacting racemic pantolactone with an alkali metal hydroxide in an aqueous medium to produce an alkali metal salt of racemic α,γ-dihydroxy-β,β-dimethylbutyric acid;
b. reacting in an aqueous medium, 1 mole of said alkali metal acid salt with 0.5 to 0.6 moles of a lower alkanoic acid or mineral acid addition salt of a phenanthrene derivative of the formula:

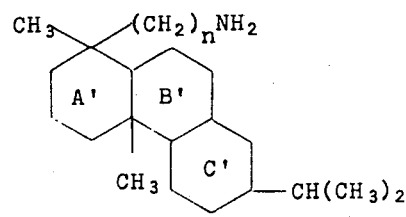

wherein n is as above; and the phenanthrene nucleus is selected from the group consisting of octahydrophenanthrene having an aromatic C' ring, Δ⁸-dodecahydrophenanthrene and perhydrophenanthrene;
c. adding to said aqueous solution containing said diastereomeric salt, a water-miscible inert organic polar solvent to thereby form the L-(+)-optical isomer of said diastereomeric salt as a precipitate with said D-(−)-salt remaining in said solution;
d. thereafter separating said precipitate from said solution; and
e. extracting said D-(−)-diastereomeric salt from said solution.

19. The process as claimed in claim 18 wherein said organic solvent is a member selected from the group consisting of a lower alkanol, a di(lower alkyl) ketone, a lower alkyl nitrile, a di(lower alkyl) lower alkanoic acid amide and a di(lower alkyl) sulfoxide.

* * * * *

UNITED STATES PATENT AND TRADEMARK OFFICE
CERTIFICATE OF CORRECTION

PATENT NO. : 3,884,966
DATED : May 20, 1975
INVENTOR(S) : Sidney Frank Schaeren

It is certified that error appears in the above—identified patent and that said Letters Patent are hereby corrected as shown below:

Cover page, after " [21] Appl. No.: 541,976" insert:

[30] Foreign Application Priority Data

April 23, 1965 - Switzerland 5703/65
March 24, 1966 - Switzerland 5703/65
March 26, 1966 - Germany H58922 IV B/120
March 28, 1966 - Austria - A2883/66

Signed and Sealed this

Seventh Day of December 1976

[SEAL]

Attest:

RUTH C. MASON
*Attesting Officer*

C. MARSHALL DANN
*Commissioner of Patents and Trademarks*